United States Patent [19]

Murayama et al.

[11] Patent Number: 5,035,594
[45] Date of Patent: Jul. 30, 1991

[54] COMPRESSION MOLDING APPARATUS

[75] Inventors: Kashiwa Murayama, Fujisawa; Nobu Utsunomiya, Hiratsuka, both of Japan

[73] Assignee: Toyo Seikan Kaisha, Ltd., Tokyo, Japan

[21] Appl. No.: 392,424

[22] Filed: Aug. 11, 1989

[51] Int. Cl.⁵ .................. B29C 39/10; B29C 45/14
[52] U.S. Cl. .................. 425/116; 425/117; 425/126.1; 425/127; 425/233; 425/236; 425/577; 425/588; 425/261; 425/361; 425/437
[58] Field of Search .............. 425/116, 117, 126.1, 425/127, 129.1, 572, 526, 588, 236, 261, 361, 437

[56] References Cited

U.S. PATENT DOCUMENTS

| | | | |
|---|---|---|---|
| 695,507 | 3/1902 | Strang | 249/142 |
| 4,312,687 | 1/1982 | Sigworth | 249/83 |
| 4,424,015 | 1/1984 | Black et al. | 425/576 |

FOREIGN PATENT DOCUMENTS

| | | |
|---|---|---|
| 57-178730 | 4/1982 | Japan . |
| 58-7322 | 1/1983 | Japan | 249/83 |

Primary Examiner—Willard E. Hoag
Attorney, Agent, or Firm—Beveridge, DeGrandi & Weilacher

[57] ABSTRACT

A compression molding apparatus for forming a plastic grip ring and simultaneously linking it integrally to a linking protruding piece of a container closure body. The apparatus includes a mold composed of a first mold portion and a second mold portion adapted to be opened or closed by being moved relative to each other in a predetermined direction. The first mold portion has an accommodating space for receiving the closure body and a first mold cavity extending in a ring-like shape. At least the free end portion of the linking protruding piece of the closure body to be received in the accommodating space is projected into the first mold cavity. The second mold portion has a main part consisting of a second mold cavity extending in a ring-like shape and a conduit hole extending in said predetermining direction from the second mold cavity and a compression rod to be slidably inserted into the conduit hole. A plastic material fed into the conduit hole is compressed by the compression rod and molded into the grip ring having a shape corresponding to a molding space defined by the cooperation of the first and second mold cavities.

6 Claims, 10 Drawing Sheets

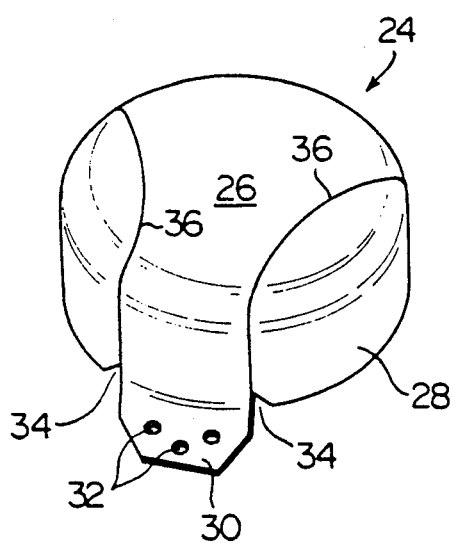
Fig. 2-A
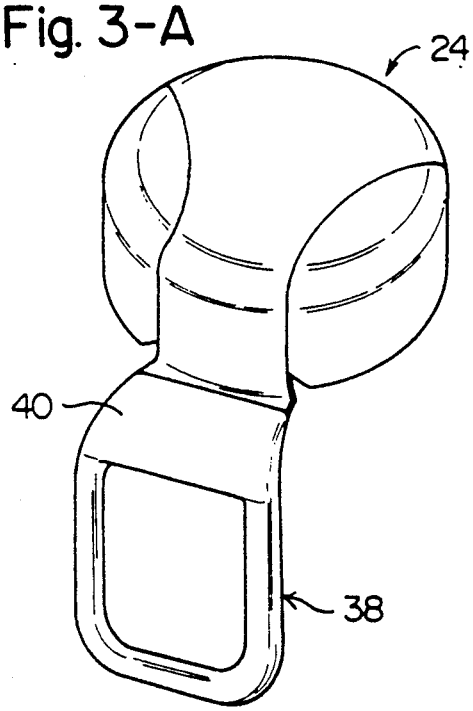
Fig. 3-A
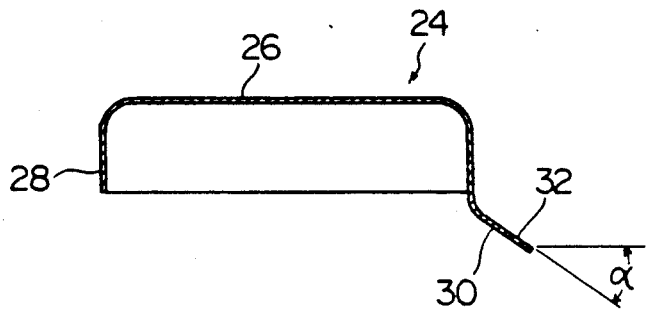
Fig. 2-B
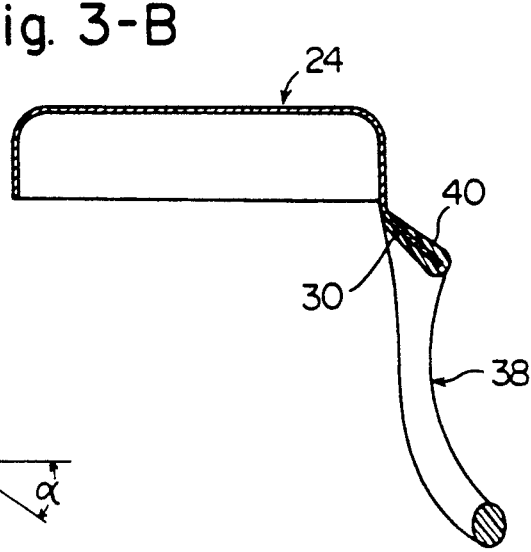
Fig. 3-B

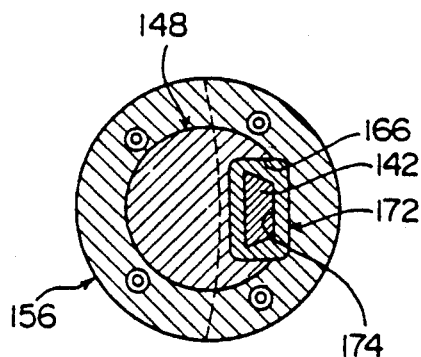
Fig. 9
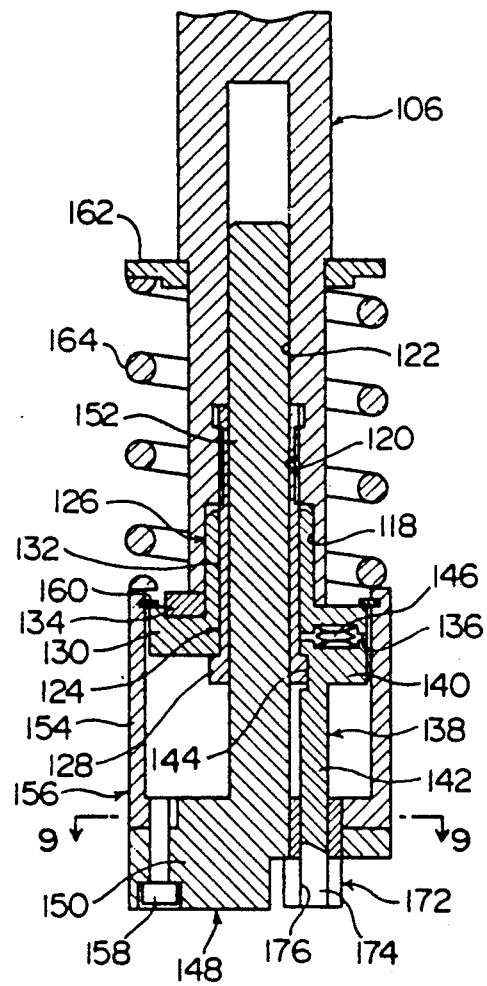
Fig. 5
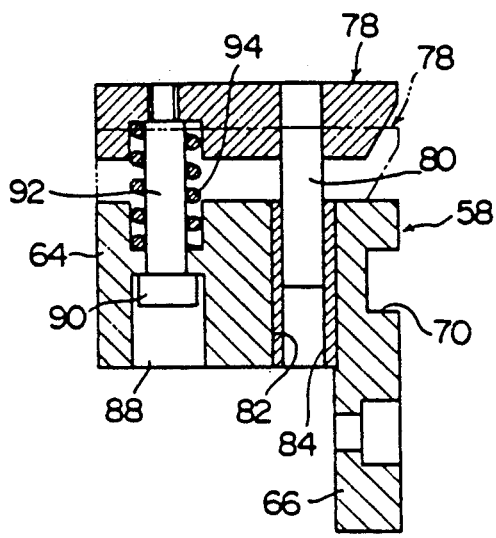
Fig. 8
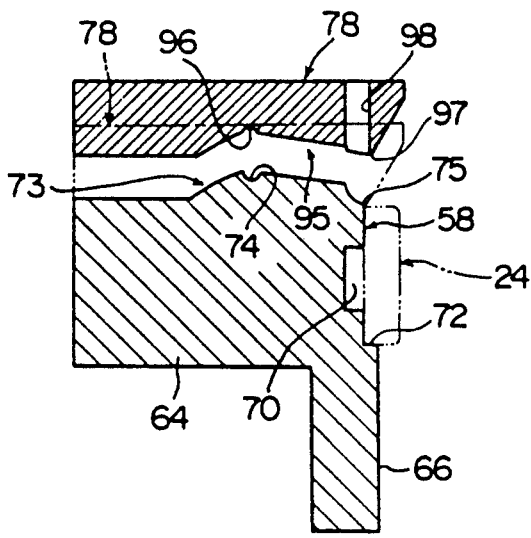

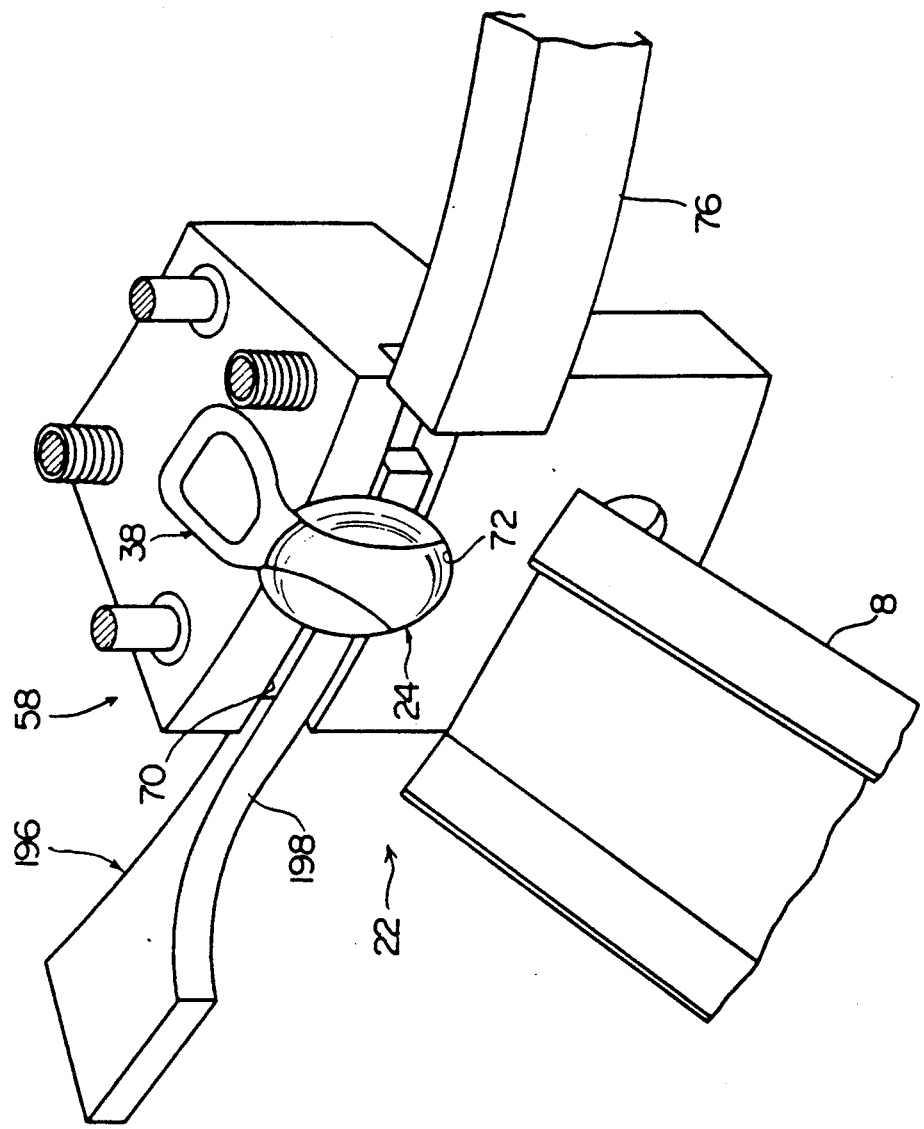

COMPRESSION MOLDING APPARATUS

FIELD OF THE INVENTION

This invention relates to a compression molding apparatus for highly efficiently forming a plastic grip ring and simultaneously liking it integrally to a linking protruding piece of a container closure body.

DESCRIPTION OF THE PRIOR ART

Japanese Laid-Open Patent Publication No. 178730/1982 discloses a container closing comprised of a metallic closure body and a plastic grip ring as a suitable example of a simple openable container closure. The closure body is shaped from a suitable thin metallic plate such as a thin aluminum-base alloy and has a circular top panel wall, a cylindrical skirt wall extending from the peripheral edge of the circular top panel wall, and a linking protruding piece protruding from part of the free end of the skirt wall. The grip ring is integrally linked to the free end portion of the linking protruding piece of the closure body.

The above-cited Japanese Laid-Open Patent Publication No. 178730/1892 also discloses that as a final step of producing the container closure, a disklike pre-fabricated article is compression-molded from a plastic material and simultaneously linked integrally with the linking protruding piece, and thereafter, the central part of the pre-fabricated article is punched out to form a grip ring.

The above step disclosed in this Japanese patent document has problems still to be solved. For example, (1) Compression molding of the pre-fabricated article and punching of its central part should be carried out separately, and therefore, not with sufficiently high efficiency. (2) The central part of the pre-fabricated article is an unwanted part to be discarded after punching. Hence, the resin material for this part is wasted. (3) Because the central part of the pre-fabricated article is made of a resin having considerable elasticity, it is very difficult, if not impossible, to punch out that part clearly.

SUMMARY OF THE INVENTION

It is a primary object of this invention to provide a novel and excellent compression molding apparatus which solves the above problems by directly compression-molding a plastic material into a grip ring of a desired shape and simultaneously linking it integrally to a linking protruding piece of a closure body.

As a result of extensive investigations, the present inventors have now found that the above technical problems can be solved by building the mold of the compression-molding apparatus in a special unique shape.

To solve the above technical problems, the present invention provides a compression molding apparatus for forming a plastic grip ring and simultaneously linking it integrally to a linking protruding piece of a container closure body; wherein the apparatus includes a mold composed of a first mold portion and a second mold portion adapted to be opened or closed by being moved relative to each other in a predetermined direction, the first mold portion has an accommodating space for receiving the closure body and a first mold cavity extending in a ring-like shape, at least the free end portion of the linking protruding piece of the closure body to be received in the accommodating space being projected into the first mold cavity, the second mold portion has a main part consisting of a second mold cavity extending in a ringlike shape and a conduit hole extending in said predetermined direction from the second mold cavity and a compression rod to be slidably inserted into the conduit hole and a plastic material fed into the conduit hole is compressed by the compression rod and molded into the grip ring having a shape corresponding to a molding space defined by the cooperation of the first and second mold cavities.

BRIEF DESCRIPTION OF THE DRAWINGS

FIGS. 2-A and 2-B are a perspective and a sectional view respectively of a container closure;

FIGS. 3-A and 3-B is a perspective and a sectional view respective of a container closure and a grip ring formed by compression molding;

FIG. 5 is a partial sectional view showing a mold in the main body shown in FIG. 4;

FIG. 8 is a sectional view taken along line A—A of FIGS. 6 and 7;

FIG. 9 is a sectional view taken along line B—B of FIG. 5;

FIGS. 15 and 16 are a partial sectional and a partial perspective view showing a discharge zone in the compression molding apparatus of the invention shown in FIG. 1.

DETAILED DESCRIPTION OF THE PREFERRED EMBODIMENTS

Figure 1:
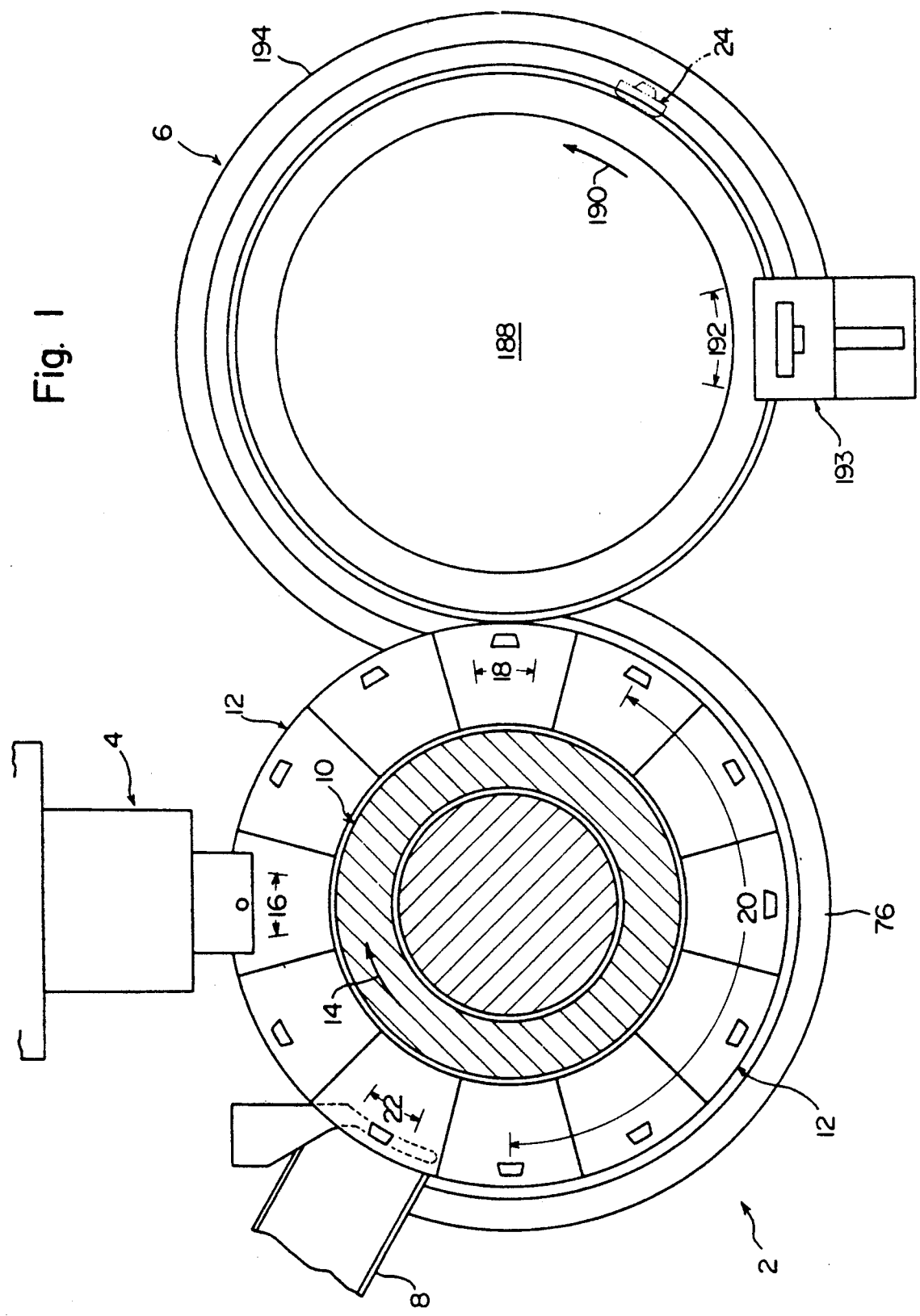
FIG. 1 is a simplified horizontal sectional view showing a compression molding apparatus in its entirety constructed in accordance with the invention.

The compression molding apparatus in
with this invention will now be described with regard to its preferred embodiments shown in the accompanying drawings.

Outline of the apparatus as a whole

The illustrated compression molding apparatus includes a rotating-type main body shown generally at 2, a plastic material feed means 4 comprised of an extruder, a container closure body feed means 6 in the form of a rotating turret, and a discharge chute 8. The main body 2, which will be described in more detail later on, comprises a rotating support member 10 mounted rotatably about a central axis extending perpendicularly to the sheet surface in FIG. 1, and a plurality of (twelve in the illustrated embodiment) molds 12 disposed in the rotating support member at circumferentially equidistant positions. The rotating support member 10 is continuously rotated in the direction shown by an arrow 14 in FIG. 1, and consequently each of the molds 12 is conveyed successively through a plastic material feed zone 16, a container closure body feed zone 18, a compression molding zone 20 and a discharge zone 22. In the plastic material feed zone 16, a plastic material is fed to each of the molds 12 by the plastic material feed means 4. In the container closure body feed zone 18, a container closure body is fed to each of the molds 12 by the container closure body feed means 6. In the compression molding zone 20, the plastic material is molded into a grip ring and integrally linked to the container closure body. The resulting container closure having the grip ring is discharged into the discharge chute 8 from each of the molds 12 in the discharge zone 22.

Container closure

FIGS. 2-A and 2-B show an example of a container closure bodY 24 fed to each of the molds 12 of the main body 2 of the compression molding apparatus from the closure body feed means 6. The closure body 24 may be formed of a suitable thin metallic plate such as a thin aluminum-base alloy plate, a thin chromatetreated steel plate or a thin tin plate, and has a circular top panel wall 26, a cylindrical skirt wall 28 extruding downwardly from the peripheral edge of the top panel wall 26, and a linking protruding piece 30 protruding from part of the free end of the skirt wall 28. The linking protruding piece 30 may project axially or substantially horizontally and radially from part of the free end of the skirt wall 28. Conveniently, however, it projects radially outwardly with a downward inclination of an angle α which may be about 15 to 60 degrees as shown. Preferably, one or a plurality of (3 in the illustrated embodiment) openings 32 are formed in the free end portions of the linking protruding piece 30 to increase the linking strength of the grip ring to be described. Furthermore, a nearly triangular recess 34 is formed in the skirt wall 28 on both sides of the base end of the linking protruding piece 30 in the closure body 24 shown in the drawings. A pair of breakable lines 36 are formed on the skirt wall 28 and the top panel wall 26 which extend from the recesses 34 in a suitable shape. The breakable lines 36 may be so-called scores. A plastic liner (not shown) of a known form may be disposed on the inside surface of the top panel wall 26.

FIGS. 3-A and 3-B show a container closure having a plastic grip ring 38 molded by the main body 2 of the compression molding apparatus. The grip ring 38 may be molded from a suitable synthetic resin such as polyethylene or polypropylene and is in the shape of a nerly rectangular ring as a whole. Its base portion 40 surrounds at least the free end portion of the linking protruding piece 30 and is integrally linked to it.

Rotating-type main body of the compression molding apparatus

Figure 4:
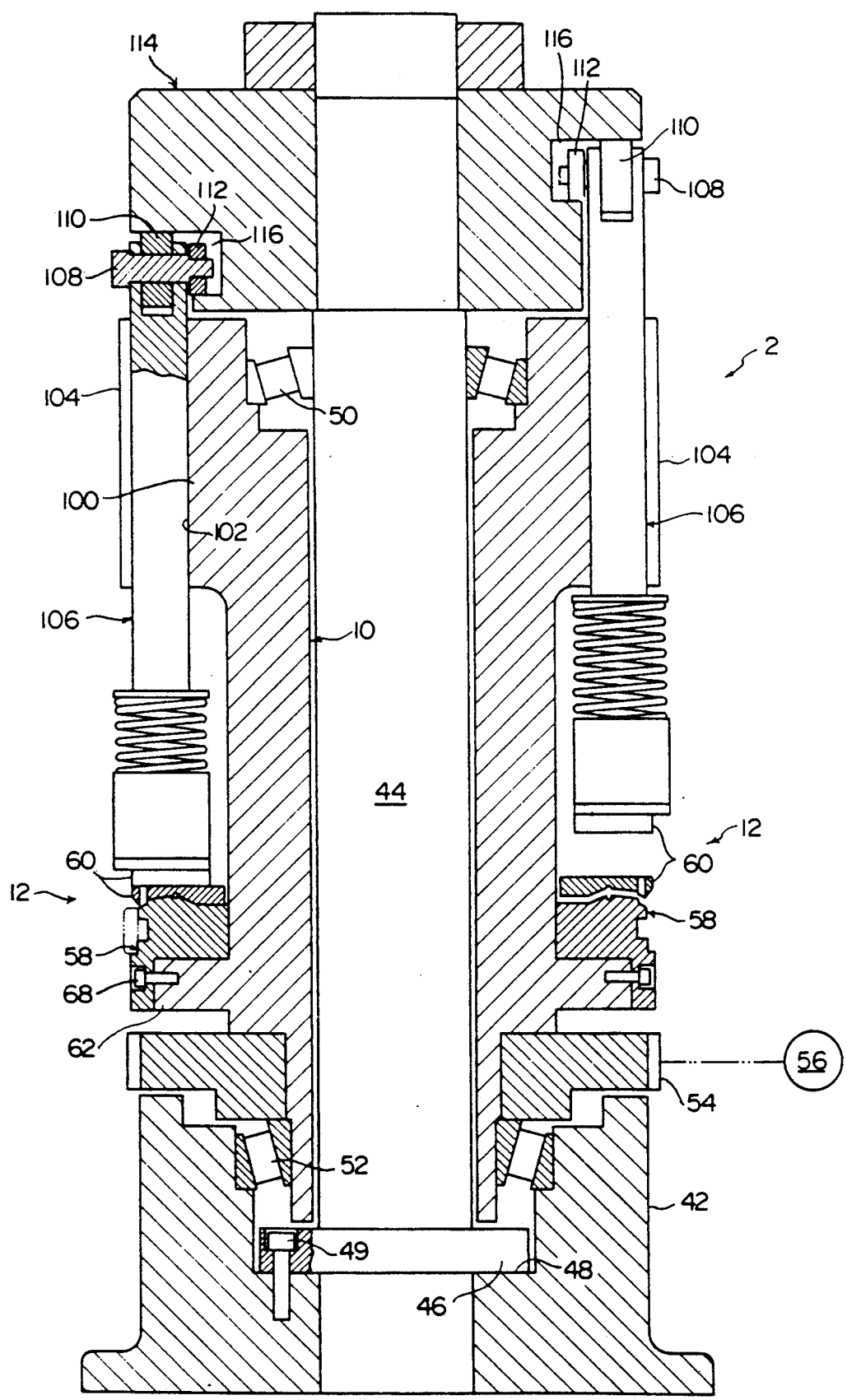
FIG. 4 is a vertical sectional view showing a rotating-type main body of the compression molding apparatus shown in FIG. 1.

With reference to FIG. 4, the rotating-type main body shown generally at 2 comprises a supporting structure consisting of a nearly cylindrical stationary supporting block 42 and a stationary supporting shaft 44 extending substantially vertically. An annular flange 46 is formed in the lower end portion of the supporting shaft 44. The flange 46 is positioned on a shoulder surface 48 formed in the inside surface of the supporting block 42, and fixed to the supporting block 42 by means of a clamping bolt 49. The nearly cylindrical rotating supporting member 10 surrounding the supporting shaft 44 is rotatably mounted on the above supporting structure by an upper bearing 50 and a lower bearing 52. An input gear 54 is fixed to the lower end portion of the rotating supporting member 10. The input gear 54 is drivingly coupled to a driving source 56 which may be an electric motor via a suitable transmission device (not shown). Thus, when the driving source 56 is energized, the rotating support member 10 is continuously rotated at a predetermined speed in the direction shown by the arrow 14 in FIG. 1.

Figure 6:
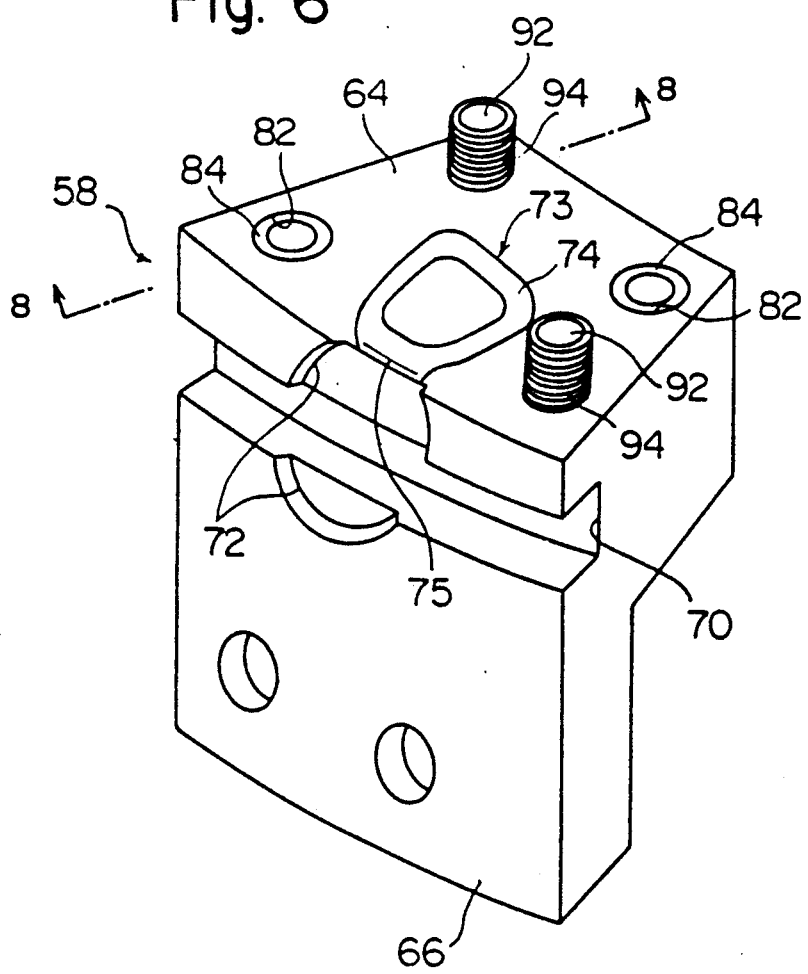
FIG. 6 is a perspective view showing a first mold portion in the mold shown in FIG. 5.

The molds 12 (twelve molds in FIG. 1) are mounted at equidistant intervals in the circumferential direction are mounted on the rotating supporting member 10. Each of the molds 12 is provided with a first mold portion 58 and a second mold portion 60. In detail, an annular supporting flange 62 is formed at the lower portion of the rotating supporting member 10 and the first mold portion 58 of each mold 12 is fixed to the upper surface of the annular supporting flange 62. With reference to FIGS. 5 and 6, the first mold portion 58 has a fan-shaped main portion 64 and an arcuate linking wall portion 66 extending downwardly from the outer peripheral edge of the main portion 64. The first mold portion 58 is fixed to the supporting flange 62 by a clamping bolt 68 (FIG. 4) screwed to the supporting flange 62 through the linking wall portion 66. As clearly shown in FIG. 6, a relatively deep groove 70 extending substantially horizontally in an arcuate shape is formed in the outer peripheral surface of the first mold portion 58 (the function of the groove 70 will be described later on). A circular depression 72 having a diameter corresponding to the outside diameter of the skirt wall 28 of the container closure body 24 is formed in the outer peripheral surface of the first mold portion 58. A raising 73 is formed in the upper surface of the first mold portion 58, and a first mold cavity 74 extending in a ring shape is formed in the raising 73. Further, on the upper surface of the first mold portion 58 is formed a depression 75 of a predetermined width connecting the front edge of the upper surface to the first mold cavity 74. Furthermore, as will be described later on, the closure body 24 fed to the mold 12 from the closure body feed means 6 is received in the first mold portion 58 while it is in the state shown by a two-dot chain line in FIG. 5. Specifically, the free end portion of the skirt wall 28 of the container closure body 24 is received in the circular depression 72 and the linking protruding piece 30 of the closure body 24 projects into the first mold cavity 74 through the depression 75. Accordingly, the circular depression 72 formed on the outer peripheral surface of the first mold portion 58 defines the accommodating space of the closure body. The radially outward movement of the closure body 24 is prevented by a stationary guide 76 (FIG. 1) extending arcuately adjacent to the outer peripheral surface of the first mold portion 58 (the stationary guide 76, particularly its upstream and down stream end portions will be described further hereinafter).

Figure 7:
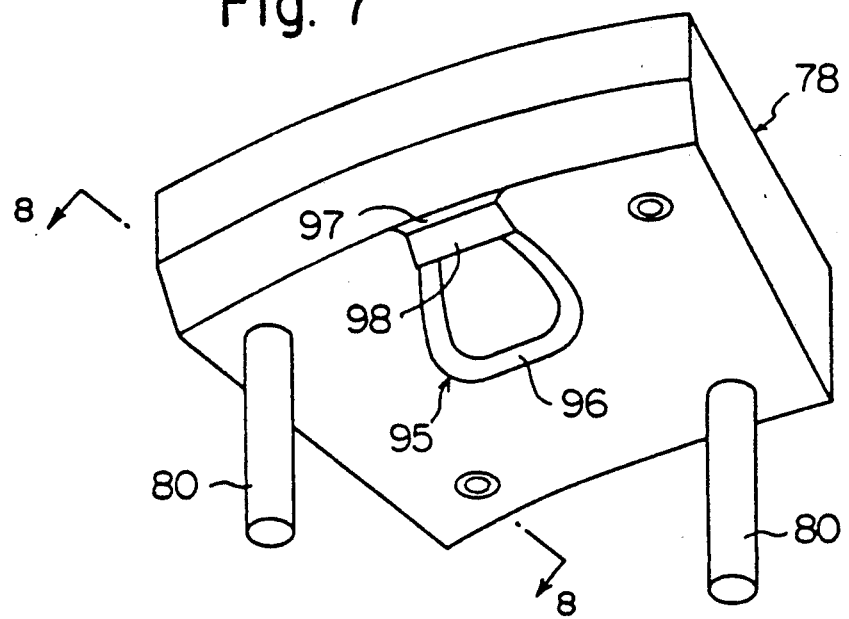
FIG. 7 is a perspective view of a mold member in the mold shown in FIG. 5.

With reference to FIG. 7 as well as FIGS. 5 and 6, a mold member 78 constituting part of the second mold portion 60 is mounted above the first mold portion 58 so that it is free to move over a predetermined range in a substantially vertical direction. As clearly shown in FIGS. 7 and 8. The mold member 78 has fixed thereto two short rods 80 extending downwardly substantially vertically. Two through-holes 82 are formed in the main portion 64 of the first mold portion 58, and sleeve members 84 are fixed respectively to the through-holes 82. The short rods 80 are slidably inserted into the sleeve members 84 respectively. Furthermore, as clearly shown in FIG. 8. A through-hole 88 having a large-diameter lower portion, a small-diameter intermediate portion and a large-diameter upper portion is formed in the first mold portion 58. A short rod member 92 having a largediameter head portion 90 received slidably in the largediameter lower portion of the through-hole 88 is inserted through the through-hole 88. The upper end portion of the short rod member 92 projects upwardly beyond the upper surface of the main portion 64 of the first mold portion 58 and is screwed to the mold member 78. An elastic means 94 of which upper end abuts with the mold member 78 is disposed in the large-diameter upper portion of the through-hole 88. The elastic means 94 may be a compression coil spring and elastically biases the mold member 78 upwardly. The upward movement of the mold member 78 is limited to a position at which the large-diameter head portion 90 of the short rod member 92 abuts with the small-diameter intermediate portion of the through-hole 88 formed in the main portion of the first mold portion 58, i.e., an elevated position (open position) shown by a solid line in FIGS. 5 and 6. When a pressing force is applied to the mold member 78 as described hereinafter, the mold member 78 is lowered to a lowered position (closed position) shown by a two-dot chain line in FIG. 5 against the elastic biasing force of the elastic means 94, the under surface of the mold member 78 is lowered to the lowered position (i.e., closed position). At this lowered position, the under surface of the mold member 78 is kept in intimate contact with the upper surface of the first mold portion 58. As shown in FIGS. 5 and 7, a depressed portion 95 is formed in the under surface of the mold member 78. A second mold cavity 96 extending in a ring-like shape is formed in the depressed portion 95. A protrusion 97 projecting slightly downwardly with a predetermined width is formed in the front edge part of the depressed portion 95. A through-hole 98 is formed which extends substantially vertically upwardly from the outermost part of the second mold cavity 96 (this through-hole 98 constitutes the lower portion of a conduit hole in the second mold portion 60 as will be clear from the following description). The through-hole 98 may have a circular cross-sectional shape, but conveniently a nearly trapezoidal to rectangular shape. When the mold member 78 is lowered to the lowered position or the closed position shown by the two-dot chain line in FIG. 5, the second mold cavity 96 formed in the under surface of the mold member 78 defines a ring-like molding space in cooperation with the first mold cavity 74 formed in the upper surface of the main portion 64 of the first mold portion 58. The linking protruding piece 30 of the closure body 24 to be received in the first mold portion 58 is projected into this molding space. Conveniently, the linking protruding piece 30 projects into the vertical intermediate portion of the molding space so that a space for resin flowing remains both in the upper surface side and the under surface side of the linking protruding piece 30. The base end portion of the linking protruding piece 30 is positioned within the depression 75 in the upper surface of the main portion 64 of the first mold portion 58, and is kept in intimate contact with the protrusion 97 in the under surface of the mold member 78. The through-hole 98 formed in the mold member 78 is positioned in correspondence to the linking protruding piece 30 projecting into the molding space.

Again, with reference to FIG. 4, a relatively thick annular supporting flange 100 is formed in the upper portion of the rotating support member 10. A plurality of (12 in the illustrated embodiment) substantially vertically extending grooves 102 are formed on the supporting flange 100 at equidistant intervals in the circumferential direction. Each of the grooves 102 is positioned in substantial alignment in the vertical direction with the first mold portion 58 fixed to the supporting flange 62. Each of the grooves 102 has a nearly square cross-sectional shape and is open at its outside surface. A plate member 104 for closing the outside surface of the groove 102 is fixed to the outer peripheral surface of the supporting flange 100. An elevator member 106 having substantially the same cross-sectional shape as the cross-sectional shape of the groove 102 is received in each of the grooves 102 for free elevation and lowering. The elevator member 106 is projected upwardly beyond the supporting flange 100, and its upper end portion is fixed to a substantially horizontally extending shaft 108. Rollers 110 and 112 constituting a cam follower are rotatably mounted on the shaft 108. On the other hand, a nearly cylindrical cam block 114 is fixed to the upper end portion of the stationary supporting shaft 44, and a cam groove 116 is formed on the peripheral surface of the cam block 114. When the rotating supporting member 10 is rotated in the direction of arrow 14 in FIG. 1, the upper and under surfaces of the cam groove 116 act respectively on the rollers 110 and 122 to elevate or lower the elevator member 106 as is desired.

With reference to FIGS. 5 in conjunction with FIG. 4, the elevator member 106 extends downwardly beyond the supporting flange 100, and has formed therein a hole extending upwardly from its under surface. This hole is circular in cross section, and has a large-diameter lower portion 118, a medium-diameter intermediate portion 120 and a small-diameter upper portion 122. Members 124 and 126 are fixed respectively to the lower portion 118 and the intermediate portion 120 of the hole. The member 124 is cylindrical and has formed an external thread on the outer peripheral surface of its upper end portion, and a corresponding internal thread is formed in the intermediate portion 120 of the hole. The upper end portion of the member 124 is threadedly fitted into the intermediate portion 120 of the hole. An outwardly bulging annular flange 128 is formed in the lower end of the member 124 which projects downwardly beyond the lower end of the elevator member 106. The member 126 has an annular bottom wall 130 and a cylindrical upstanding wall 132 extending upwardly from the inner circumferential edge of the bottom wall 130. The bottom wall 130 of the member 126 is held between the under surface of the elevator member 106 and the upper surface of the annular flange 128 of the member 124 to hamper the elevation or lowering of the member 126 relative to the elevator member 106. A key groove is formed at a predetermined angular position in the lower end of the elevator member 106 and the upper surface of the bottom wall 130 of the member 126. By keys 134 inserted in the key grooves, the relative rotation of the member 126 with respect to the elevator member 106 is prevented. A recess 136 is formed at a specific angular position in the under surface of the bottom wall 130, and in relation to this recess 136, a compression rod 138 is provided. The compression rod 138 has an enlarged head portion 140 and a rod portion 142 extending downwardly in a substantially vertical direction from the enlarged head portion 140. A groove 144 is formed in the inside surface of the enlarged head portion 140 of the compression rod 138, and part of the annular flange 128 is received in the groove 144. Since the length in the vertical direction of the groove 144 is slightly larger than the thickness of the annular flange 128, the compression rod 138 can move over some range in the vertical direction relatively to the member 124. An elastic means 146 which may be a plate spring is interposed between the bottom wall 130 of the member 126 and the head portion 140 of the compression rod 138. The elastic means 146 elastically biases the compression rod 138 downwardly with a relatively large force (which may be, for example, about 150 kg) to cause the upper surface of the groove 144 to abut with the upper surface of the annular flange 128.

A member 148 is further mounted to the lower end portion of the elevator member 106. With reference to FIG. 9 in conjunction with FIG. 5, the member 148 has a nearly fan-shaped mounting block 150 and a solid cylindrical portion 152 extending upwardly in a substantially vertical direction from the mounting block 150. As shown in FIG. 5, the solid cylindrical portion 152 of the member 148 is inserted slidably in the small-diameter upper portion 122 of the hole of the elevator member 106 via the member 124. A member 156 having a cylindrical upstanding wall 154 extending upwardly in a substantially vertical direction is fixed to the mounting block 150 of the member 148 by means of a clamping bolt 158. A stop ring 160 is fixed to the inner circumferential surface of the upper end portion of the upstanding wall 154 of the member 156. An annular spring bearing 162 is fixed to the outer peripheral surface of the elevator member 106, and an elastic means 164 which may be a coil spring is interposed between the spring bearing 162 and the upper end of the upstanding wall 154 of the member 156. The elastic means 164 elastically biases the members 156 and 148 downwardly. The downward movement of the members 156 and 148 with respect to the elevator member 106 is restricted by the contacting of the stop ring 160 with the upper surface of the bottom wall 130 of the member 126. As shown in FIG. 9, recess which in cooperation with each other define a nearly rectangular through-opening 166 are formed in the lower portions of the mounting block 150 of the member 148 and of the member 156. The upper half of a resin receiving member 172 is inserted in the opening 166 and fixed by a suitable means (not shown) such as an anchoring pin. A through-hole 174 is formed in the resin receiving member 172. The through-hole 174 has the same cross-sectional shape as the through-hole 98 formed in the mold member 78 and is positioned in alignment with the through-hole 98. The through-hole 174 cooperates with the through-hole 98 to constitute a conduit hole in the second mold portion 60. As can be understood from FIG. 10 as well as FIG. 5, in the exposed lower half of the resin receiving member 172, a recess 176 is formed in the front side in the rotating direction shown by arrow 14 (FIG. 1) of the rotating supporting member 10, and serves to keep the through-hole 174 open. As shown in FIG. 9, the rod portion 142 of the compression rod 138 is inserted in the through-hole 174. The rod portion 142 has substantially the same cross-sectional shape as the through-hole 174.

Resin material feed zone

Figure 10:
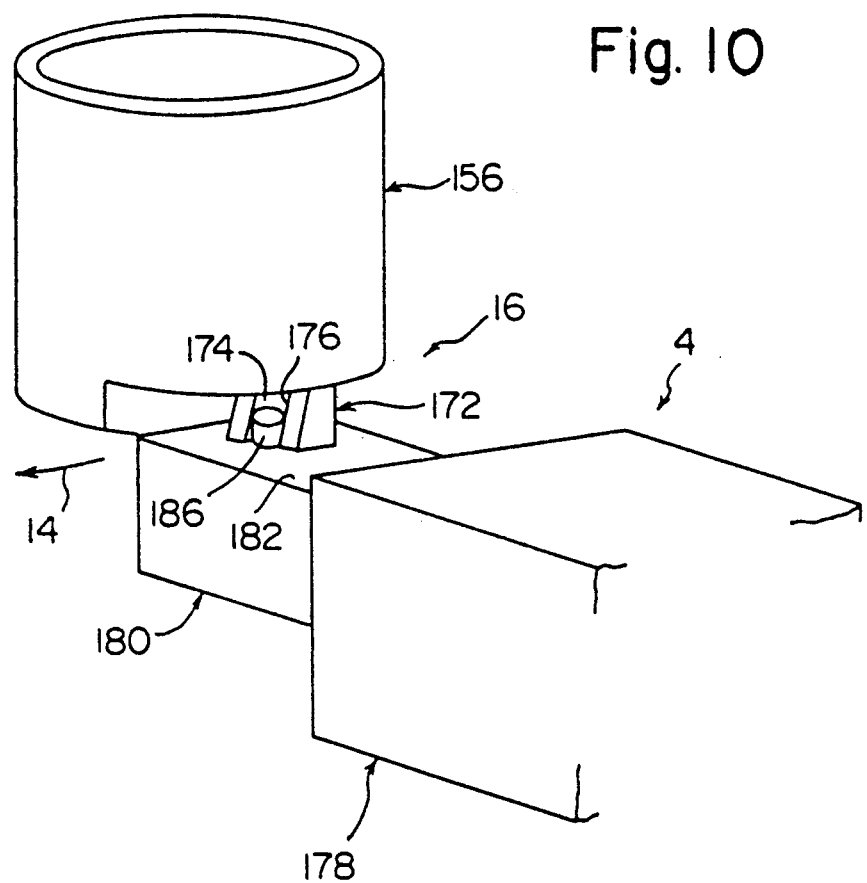
FIGS. 10 and 11 are a partial perspective and a partial sectional view showing a plastic material feed zone in the compression molding apparatus shown in FIG. 1.
Figure 11:
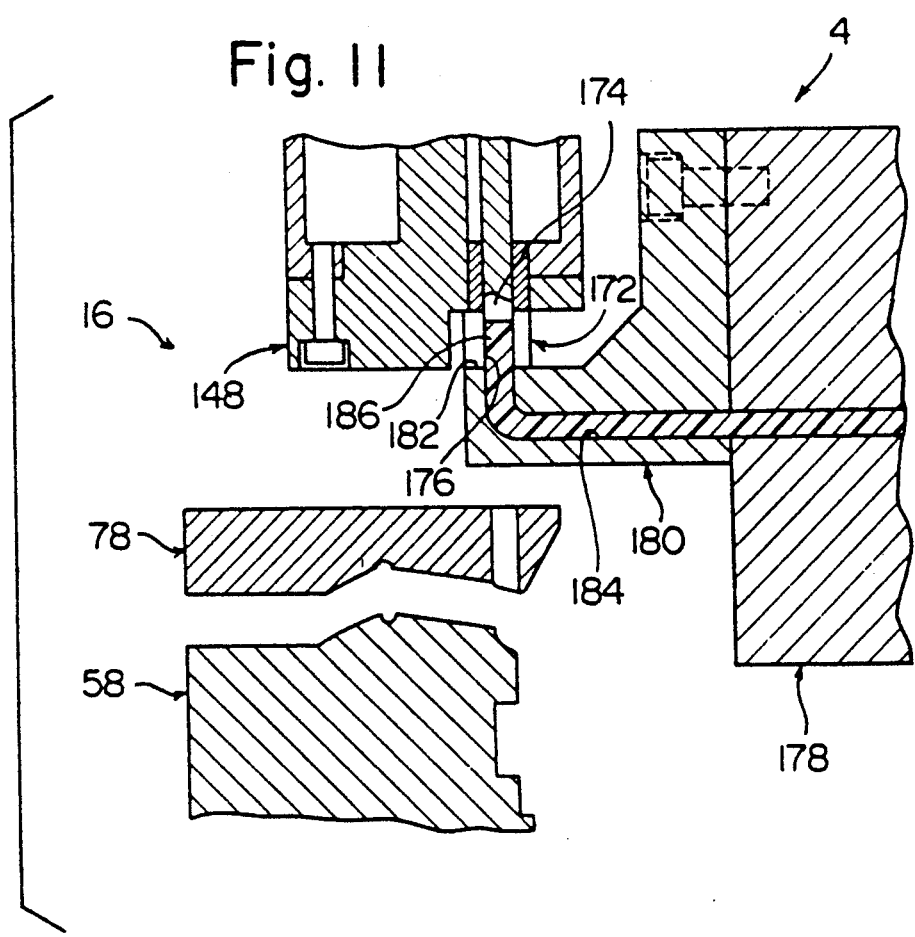

With reference to FIGS. 10 and 11 in conjunction with FIG. 1, the plastic material feed means 4 disposed in relation to the plastic material feed zone 16 includes an extruder body 178 and an extrusion block 180 fixed to it. The extrusion block 180 includes a projecting portion having a substantially horizontal upper surface 182. The extrusion block 180 has formed therein an extrusion passage 184 which extends from its inlet end connected to the extrusion outlet of the extruder body 178 to its outlet end opening into the upper surface 182. A plastic material in the heat-melted state fed from the extruder body 178 which is of a known form is fed through the extrusion passage 184 of the extrusion block 180 and extruded upwardly from the upper surface 182. The plastic material may be a suitable thermoplastic synthetic resin such as polyethylene or polypropylene.

The operation in the plastic material feed zone 16 will be described. During passage through the plastic material feed zone, the constituent elements of the mold 12 are at the position shown in FIG. 11. Specifically, the mold member 78 exists at an elevated position spaced upwardly from the first mold portion 58, and the plastic receiving member 172 mounted on the elevator member 106 (FIG. 5) is positioned at a site spaced upwardly from the mold member 78 by a predetermined distance. The projecting portion of the extrusion block 180 in the plastic material feed means 4 projects between the mold member 78 and the plastic receiving member 172. The lower end of the plastic receiving member 172 contacts or approaches the upper surface 182 in the projecting portion of the extrusion block 180. It will be understood from FIGS. 10 and 11 that when the plastic receiving member 172 moves in the direction of arrow 14 in FIG. 10 by the rotation of the rotating supporting member 10, a plastic material 186 extruded from the upper surface 182 in the projecting portion of the extrusion block 180 is received in the through-hole 174 in the lower half of the plastic receiving member 172 via the recess 176 formed in the lower half of the plastic receiving member 172. As the plastic receiving member 172 further moves in the direction of arrow 14 in FIG. 10, the extruded plastic material 186 is cut by the cutting action of the upper surface 182 of the projecting portion in the extrusion block 180 and the under surface of the plastic receiving member 172 acting in cooperation. The cut plastic material 186 is held in the through-hole 174 of the plastic receiving member 172 by its own tackiness and moved together with the plastic receiving member 172.

Container closure body feed zone

Figure 12:
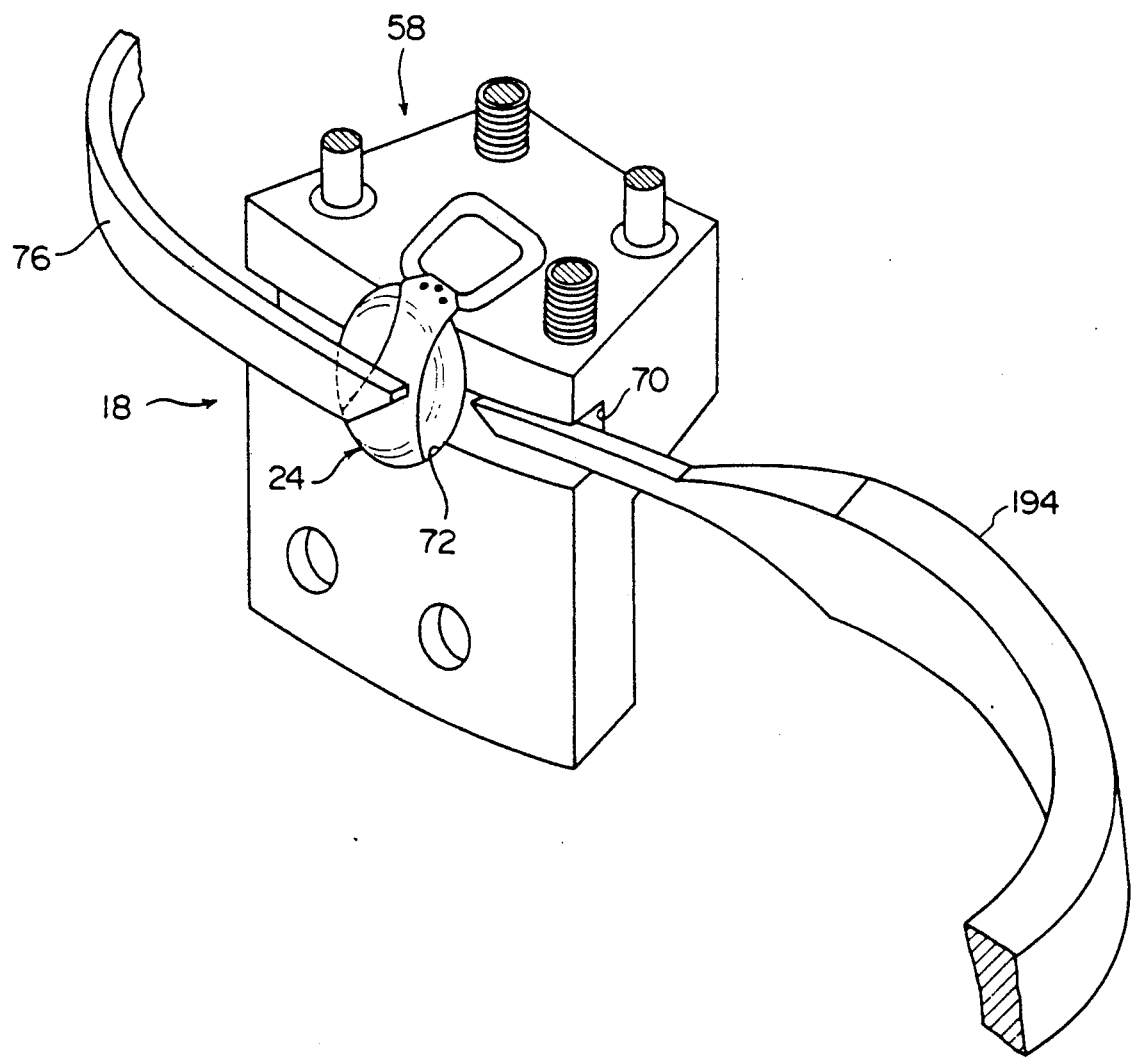
FIG. 12 is a partial perspective view showing a container closure feed zone in the compression molding apparatus shown in FIG. 1.

Again, with reference to FIG. 1, the container closure body feed means 6 provided in relation to the closure body feed zone 18 includes a rotating disc 188 mounted for free rotation about a substantially vertically extending central axis as a center. A plurality of closure body receiving depressions (not shown) are formed on the peripheral surface of the rotating disc 188. The rotating disc 188 is rotated in the direction shown by an arrow 190 in synchronism with the rotation of the rotating support member 10 of the main body 2 of the compression molding apparatus. While the rotating disc 188 rotates in the direction of arrow 190, closure bodies 24 are fed into the receiving depressions of the rotating disc 188 from a feed chute 198 in a receiving zone shown by numeral 192. The closure bodies 24 are conveyed to the closure body feed zone 18 by the rotation of the rotating disc 188. During this time, the closure bodies 24 are prevented from dropping off radially outwardly from the receiving depressions by a stationary guide 194 extending arcuately along the periphery of the rotating disc 188 from the receiving zone 192 to the closure body feed zone 18. In the closure body feed zone 18, the closure bodies 24 are transferred to the molds 12 of the main body 2 of the compression molding apparatus from the receiving depressions of the rotating disc 188. With reference to FIG. 12, the downstream end portion of the stationary guide 194 is decreased in vertical size upstream of the closure body feed zone and received in the deep part of the groove 70 formed in the first mold portion 58 of the mold 12 in the main body 2 of the compression molding apparatus. On the other hand, the stationary guide 76 in the main body 2 of the compression molding apparatus extends toward the discharge zone 22 from the downstream side of the closure body feed zone 18 (see FIG. 1 also). In the closure body feed zone 18, each receiving depression of the rotating disc 188 is positioned opposite to each circular depression 72 in the first mold portion 58, and the closure body 24 is positioned astride the receiving depression and the circular depression 72. The half, on the top panel wall side, of the closure body 24 is received in the receiving depression, and its other half on the side of the free end portion of the skirt wall, in the circular depression 72. Downstream of the closure body feed zone 18, the closure body 24 is permitted to move outwardly from the receiving depression, but its outward movement from the circular depression 72 is hampered by the stationary guide 76. Thus, the closure body 24 is transferred from the receiving depression to the circular depression 72, and moved together with the first mold portion 58 while it is held in the circular depression 72.

The closure body feed means 6 itself may be of substantially the same type as disclosed in the specifications of Japanese Laid-Open Patent Publications Nos. 191532/1984 and 191533/1984. Accordingly, the disclosures of these specifications are cited herein in lieu of describing the structure of the closure body feed means 6 in detail.

Compression molding zone

Figure 13:
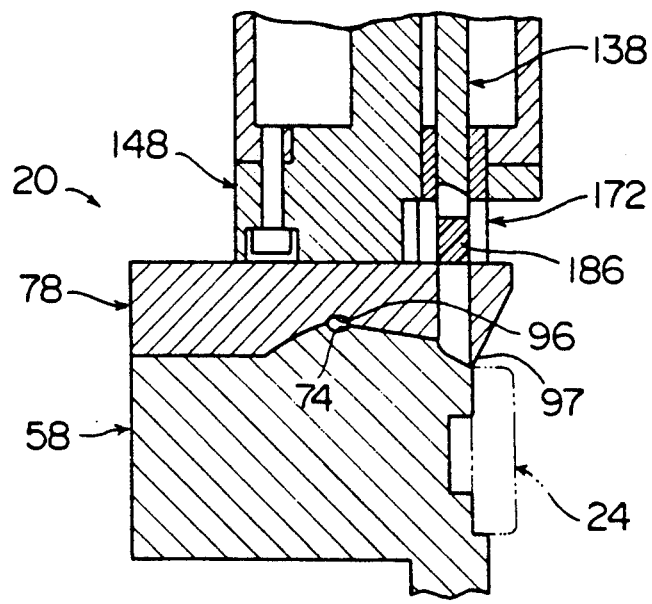
FIGS. 13 and 14 are partial sectional views showing the upstream portion and downstream portion respectively of a compression-molding zone in the compression-molding apparatus shown in FIG. 1.
Figure 14:
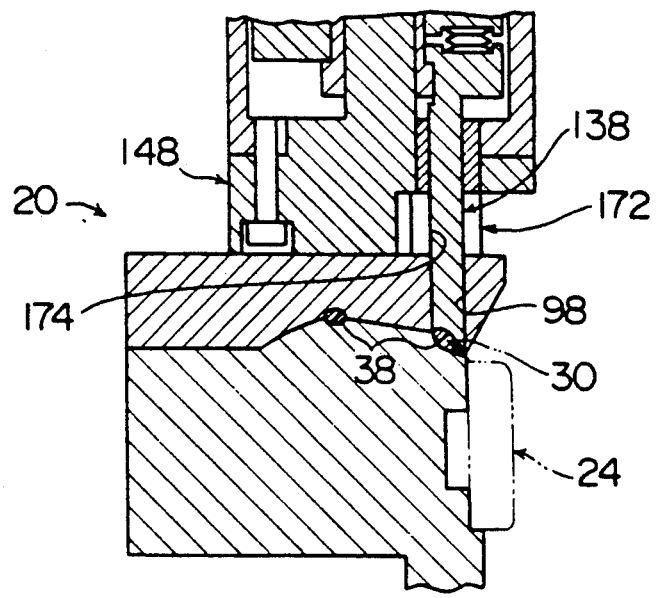

With reference to FIGS. 1, 13 and 14, when the mold 12 of the main body 2 of the compression molding apparatus passes through the compression molding zone 20, the elevator member 106 (FIG. 5) is gradually lowered. While the elevator member 106 is lowered to the position shown in FIG. 13, the lower end of the member 148 and the lower end of the resin receiving member 172 contact and depress the upper surface of the mold member to lower the mold member 78 to the closed position against the elastic biasing action of the elastic means 94 (FIG. 8). As a result, the under surface of the mold member 78 is brought into intimate contact with the upper surface of the first mold portion 58, and a ring-like molding space is defined by the cooperation of the first mold cavity 74 of the first mold portion 58 and the second mold cavity 96 of the mold member 78. Furthermore, as stated hereinabove, the protrusion 97 of the mold member 78 is kept into intimate contact with the base end portion of the linking protruding piece 30 of the closure body 24 positioned in the depression 75 of the first mold portion 58 to seal up the front edge portion of the molding space (see FIGS. 5 to 7 as well).

The elevator member 106 is further lowered to the position shown in FIG. 14. Since at this time, the member 148 and the plastic receiving member 172 are already in contact at their lower ends with the mold member 78 which has been lowered to the closed position, they cannot further descend. Accordingly, they are elevated relative to the elevator member 106 against the elastic biasing action of the elastic means 164 (FIG. 5). In the meantime, the compression rod 138 continues to descend with the elevator member 106. It will be seen from FIGS. 13 and 14 by comparison that the compression rod 138 acts on the plastic material 186 present in the through-hole 174 of the resin material receiving member 172, and compresses it forcibly into the molding space via the through-hole 98 of the mold member 78. As a result, the plastic material 186 is molded into the grip ring 38 having the form shown in FIG. 3-A corresponding to the shape of the molding space. At the same time, since the linking protruding piece 30 of the closure body 24 projects into the molding space, the base portion 40 of the grip ring 38 surrounds the linking protruding piece 30 and therefore, the grip ring 38 is linked to the linking protruding piece 30. As is well known to those skilled in the art, it is very difficult, if not impossible, to adjust the amount of the plastic material 180 to be fed to the throughhole 174 of the plastic receiving member 172 accurately to a predetermined value, and there is some error in the amount of the plastic material 186. In the illustrated embodiment, the amount of the plastic material 186 fed is set at a slightly excessive amount, and the excess of the plastic material 186 is compensated by some elevation of the compression rod 138 against the relatively large elastic biasing action of the elastic means 146 (FIG. 5) at the end of compression molding.

Discharge zone

Figure 15:
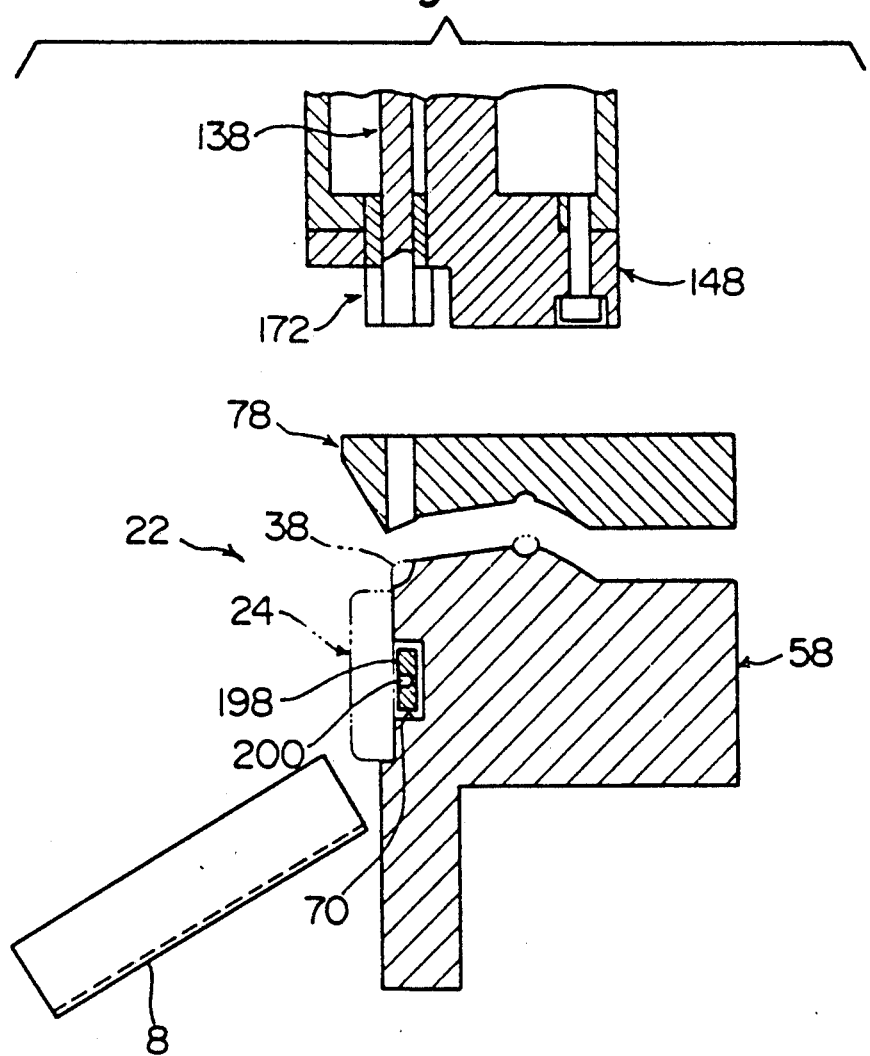

With reference to FIG. 15 in conjunction with FIG. 1, when the molds 12 are moved from the compression molding zone 20 to the discharge zone 22, the elevator member 106 (FIG. 5) is elevated gradually to the position shown in FIG. 15. Thus, the mold member 78 is elevated to the open position by the elastic biasing action of the elastic means 94. The plastic receiving member 172 and the compression rod 138 are moved away from the mold member 78. In addition, the member 148 and the plastic receiving member 172 are lowered to the lowest limit position relative to the elevator member 106 by the elastic biasing action of the elastic biasing action. In the discharge zone 22, container closures each having the closure body 24 and the grip ring 38 are discharged into the discharge chute 8 from the molds 12. With reference to FIG. 16 as well as FIG. 15, the stationary guide rail 76 for preventing the closure from dropping off outwardly from the circular depression 72 of the first mold portion 58 terminates at the upstream side of the discharge zone 22. Accordingly, in the discharge zone 22, the closure can move outwardly of the circular depression 72. In the illustrated embodiment, an air jet-type closure discharging means 196 is further disposed in relation to the discharge zone 22. The discharge means 196 includes a stationary member 198 having a rail-like end portion which advances into the deep portion of the groove 70 formed in the first mold portion 58 and is positioned inwardly of the closure. As shown in FIG. 15, one or a plurality of jet holes 200 (FIG. 15) opened toward the closure are formed in those sites of the end portion of the stationary member 198 which are opposite to the closure. These jet holes are connected to a compression air supply source (not shown) via air passages (not shown) formed in the stationary member 198. Accordingly, the compressed air supplied from the compression air supply source is jetted from the jet holes 200 against the closures positioned in the circular depressions 72 of the first mold portion 58. As a result, the closures are accurately discharged outwardly from the circular depressions 72 and fed into the discharge chute 8. Then, the closures are conveyed to a suitable collection zone through the discharge chute 8.

While the present invention has been described in detail with regard to its preferred embodiments shown in the accompanying drawings, it should be understood that the invention is not limited to these specific preferred embodiments, and various changes and modifications are possible without departing from the scope of the invention described and claimed herein.

What we claim is:

1. A compression molding apparatus for forming a plastic grip ring and simultaneously linking it integrally to a linking protruding piece of a container closure body, said linking protruding piece having a free end portion; wherein the apparatus include a mold composed of a first mold portion and a second mold portion adapted to be opened or closed by being moved relative to each other in a predetermined direction, the first mold portion has an accommodating space for receiving the closure body and a first mold cavity extending in a ring-like shape, said accommodating space being located where a closure body received therein will have its free end portion projecting into the first mold cavity, the second mold portion has a main part including a second mold cavity extending in a ring-like shape and a conduit means for receiving a plastic material, said conduit means communicating with said second mold cavity and extending in said predetermined direction from the second mold cavity, a compression rod slidably inserted into the conduit means, and means for moving said compression rod in said conduit means to compress a plastic material fed into the conduit means and mold it into the grip ring having a shape corresponding to a molding space defined by the cooperation of the first and second mold cavities.

2. The compression molding apparatus of claim 1 wherein the apparatus comprises a rotatable support member mounted for rotation about a substantially vertically extending axis;

a plurality of said molds are provided in the rotatable support member at circumferentially equidistant positions such that the first and second mold portions are free to move relative to each other in a substantially vertical direction;

the molds are by the rotation of the rotatable support member successively through a plastic material feed zone, a closure body feed zone, a compression molding zone and a discharge zone;

the apparatus also comprises a plastic material feed means for feeding the plastic material into the conduit hole of the main part of the second mold portion to each of the molds in the plastic material feed zone, a compression rod a container closure body feed means for feeding the closure body into the accommodating space of the first mold portion of each of the molds in the closure body feed zone, and a closure discharge means for discharging a container closure having a closure body and a compression-molded grip ring from each of the molds in the discharge zone; and in the compression molding zone, the first and second mold portions of each of the molds are closed to define the molding space by the cooperation of the first and second mold cavities and the plastic material is compression molded by the compression rod, and when it is conveyed to the discharge zone from the compression molding zone, each of the molds is opened.

3. The compression molding apparatus of claim 2 wherein the first mold portion of each of the molds is fixed to the rotatable support member, and the second mold portion of each of the molds is mounted on the rotatable support member for free movement in a substantially vertical direction above the first mold portion.

4. The compression molding apparatus of claim 3 wherein the main part of the second mold portion in each of the molds includes a mold member having the second mold cavity formed in its under surface and a plastic material receiving member mounted for free movement relative to the mold member between a lowered position at which it makes contact with the upper surface of the mold member and an elevated position at which it is away upwardly from the upper surface of the mold member, the conduit means extends upwardly from the second mold cavity through the mold member and the plastic material receiving member, the plastic material receiving member being held at the elevated position in the plastic material feed zone, the plastic material feed means being constructed of an extruder having a discharge end surface positioned to contact or approach the under surface of the plastic material receiving member in the plastic material feed zone, and the plastic material extruded from the extruder being receivable in that part of the conduit hole which is formed in the plastic material receiving member in the plastic material feed zone.

5. The compression molding apparatus of claim 4 wherein that part of the conduit means which is formed in the plastic material receiving member has a front side, said conduit means having its front side opened in the rotation direction of the rotatable support member.

6. The compression molding apparatus of claim 1 wherein the conduit means extends in said predetermined direction in alignment with at least the free end portion of the linking protruding piece int he closure body.

* * * * *